United States Patent
Ebato et al.

(10) Patent No.: US 8,760,554 B2
(45) Date of Patent: Jun. 24, 2014

(54) INFORMATION PROCESSING APPARATUS, IMAGING APPARATUS, IMAGE DISPLAY CONTROL METHOD AND COMPUTER PROGRAM

(75) Inventors: Satoshi Ebato, Tokyo (JP); Kenji Tsushio, Tokyo (JP); Tatsuhito Tabuchi, Tokyo (JP); Kou Kobayashi, Tokyo (JP); Yoshihito Okizaki, Tokyo (JP); Shigeru Masuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 252 days.

(21) Appl. No.: 12/043,366

(22) Filed: Mar. 6, 2008

(65) Prior Publication Data

US 2008/0225155 A1 Sep. 18, 2008

(30) Foreign Application Priority Data

Mar. 15, 2007 (JP) ................. 2007-066169

(51) Int. Cl.
*H04N 5/222* (2006.01)

(52) U.S. Cl.
USPC .................................................. 348/333.05

(58) Field of Classification Search
USPC .................................................. 348/333.05
See application file for complete search history.

(56) References Cited

U.S. PATENT DOCUMENTS

| | | | |
|---|---|---|---|
| 6,408,301 B1 * | 6/2002 | Patton et al. ................... 707/741 |
| 7,433,518 B2 * | 10/2008 | Shiratani ........................ 382/190 |
| 2001/0040560 A1 | 11/2001 | Amron | |
| 2003/0068087 A1 * | 4/2003 | Wu et al. ........................ 382/190 |
| 2004/0001220 A1 | 1/2004 | Gorday et al. | |
| 2004/0189692 A1 | 9/2004 | Tojo et al. | |
| 2005/0262527 A1 * | 11/2005 | Yuzawa et al. ................... 725/10 |
| 2006/0044446 A1 | 3/2006 | Porter et al. | |
| 2006/0120692 A1 | 6/2006 | Fukuta | |
| 2006/0227871 A1 * | 10/2006 | Budagavi ................. 375/240.12 |
| 2007/0030375 A1 * | 2/2007 | Ogasawara et al. ...... 348/333.11 |
| 2007/0031066 A1 | 2/2007 | Nakano | |

FOREIGN PATENT DOCUMENTS

| | | |
|---|---|---|
| CN | 1531734 A | 9/2004 |
| CN | 1908961 A | 2/2007 |
| GB | 2 395 852 A | 6/2004 |
| JP | 2001-167110 | 6/2001 |
| JP | 2002-27363 | 1/2002 |
| JP | 2005-269563 | 9/2005 |

(Continued)

OTHER PUBLICATIONS

U.S. Appl. No. 12/035,831, filed Feb. 22, 2008, Ebato, et al.

(Continued)

*Primary Examiner* — Albert Cutler
(74) *Attorney, Agent, or Firm* — Oblon, Spivak, McClelland, Maier & Neustadt, L.L.P.

(57) ABSTRACT

An apparatus for processing image, includes an input unit for inputting user operation information, a recording medium for recording moving image data, a data processor for retrieving data recorded on the recording medium and generating display data in response to an input to the input unit, and a display unit for displaying the display data. The data processor selects a frame containing an image of a person's face from a scene as a moving image recording unit recorded on the recording medium, generates a thumbnail image of a face region extracted from the selected frame and displays on the display unit a list of generated thumbnail images arranged in a time-series order.

23 Claims, 8 Drawing Sheets

(56) References Cited

FOREIGN PATENT DOCUMENTS

| | | |
|---|---|---|
| JP | 2006-211041 | 8/2006 |
| JP | 2006-277409 | 10/2006 |
| JP | 2007-19678 | 1/2007 |

OTHER PUBLICATIONS

Japanese Office Action issued Aug. 23, 2011, in Patent Application No. 2007-066169.

Taiwanese Office Action issued Aug. 30, 2011, in Patent Application No. 097104313 (English-language translation only).

Chinese Office Action issued Oct. 8, 2012, in Patent Application No. 200810085380.8 (with English-language translation).

Office Action mailed Jan. 21, 2014, in Korean Patent Application No. 2008-0023826 (with English-language Translation).

\* cited by examiner

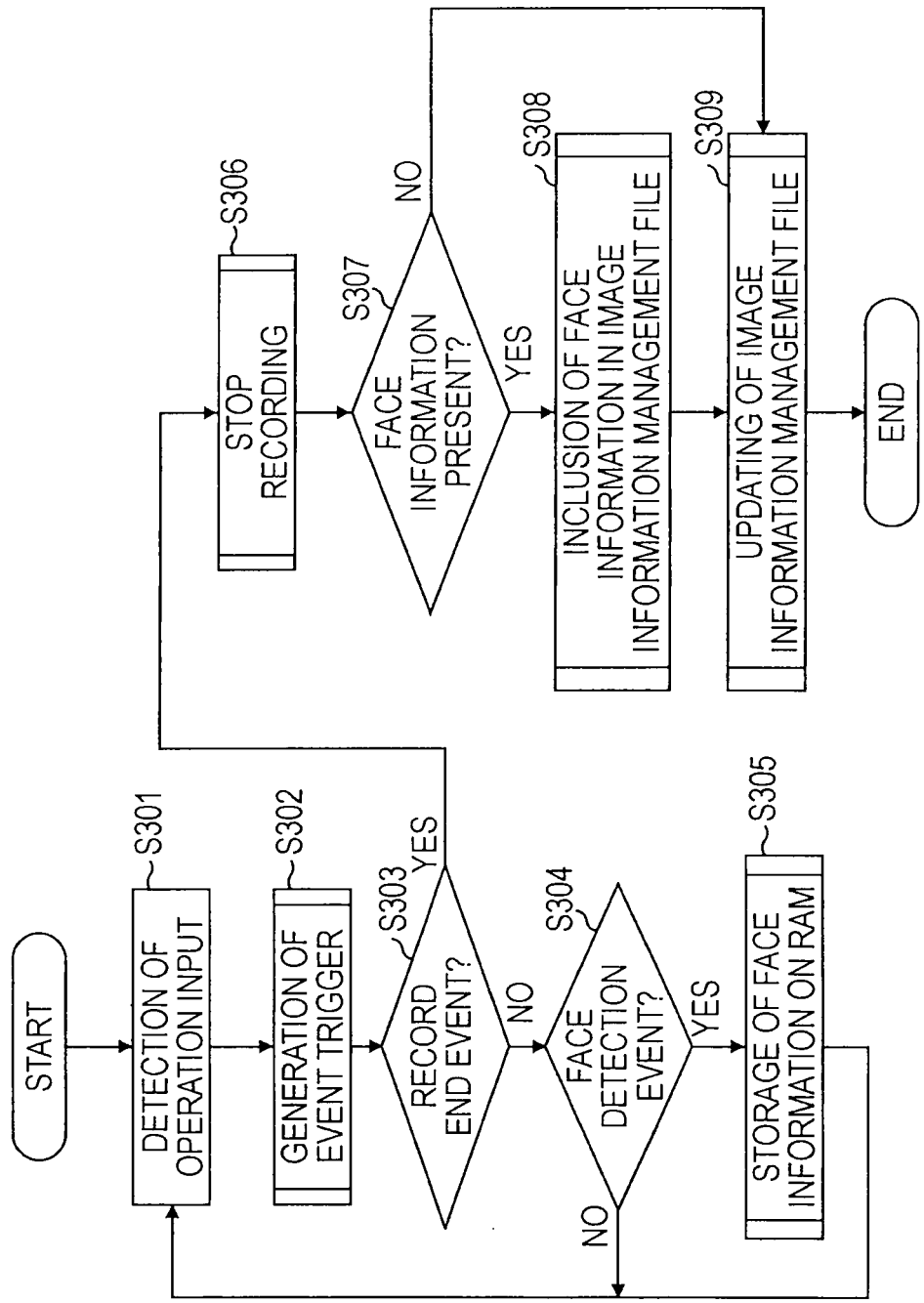

INFORMATION PROCESSING APPARATUS, IMAGING APPARATUS, IMAGE DISPLAY CONTROL METHOD AND COMPUTER PROGRAM

CROSS REFERENCES TO RELATED APPLICATIONS

The present invention contains subject matter related to Japanese Patent Application JP 2007-066169 filed in the Japanese Patent Office on Mar. 15, 2007, the entire contents of which are incorporated herein by reference.

BACKGROUND OF THE INVENTION

1. Field of the Invention

The present invention relates to an information processing apparatus, an imaging apparatus, an image display control method and a computer program. More particularly, the present invention relates to an information processing apparatus, an imaging apparatus, an image display control method and a computer program for displaying, in a list of thumbnail images, images selected from a great deal of moving image data picked up by a video camera, for example, and starting a moving image playing process at a position of a thumbnail image in response to a user designation of the thumbnail image from the thumbnail image list.

2. Description of the Related Art

Many of imaging apparatuses such as a digital camera and a digital video camera and image processing apparatuses such as a digital versatile disk (DVD) player have a function of displaying on a video display unit or a monitor screen a list of image data stored on a recording medium.

For example, an apparatus playing a moving image, such as an imaging apparatus or a DVD player, displays titles of moving images and chapters in a menu form and allows a user to select a play content from display data for playing. For example, an imaging apparatus picks up a moving image and captures, as one scene, moving image data in one cycle of photographing process, namely, from a start of a photographing operation to an end of the photographing operation and displays a reduced image (thumbnail image) of a representative image selected from each scene. The imaging apparatus displays a list of thumbnail images of a plurality of scenes (moving image data) recorded on a recording medium. One scene is also referred to a cut.

For example, Japanese Laid Open Patent Publication No. Hei 10-028250 discloses a technique of displaying a contracted image (thumbnail image) of a representative image selected from each scene.

Since a monitor displays the contracted image (thumbnail image) of image data forming each image data file stored on the recording medium, a user learns captured image data to some degree.

A single thumbnail image is displayed on a per scene basis in the list of thumbnail images displayed on a DVD player or a video camera in the related art. More specifically, the moving image data from the start of the photographing operation to the end of the photographing operation is handled as one scene. A representative image is selected from one scene. For example, a head image of one scene is selected and a thumbnail image of the selected image is then displayed.

A variety of moving image data (scenes) is recorded on the recording medium. The moving image data changes in time length from scene to scene, for example a short scene may be several seconds long and a long scene may be one hour long, for example. It may be sometimes difficult to determine what is photographed in a scene. When a list of thumbnail images is displayed, a still image of the head image of each scene is selected, and displayed in a contracted size. It may be often difficult for a user to learn the content of the image data from the head image. The displaying of the head image alone does not necessarily allow the user to learn what the moving image presents.

When a play scene is selected from the thumbnail image list, the selected scene is played from the beginning thereof. A portion of the scene the user is really interested in may typically appear in the middle of the scene rather than in the beginning of the scene. In such a case, the user starts playing, then performs a fast-forward operation and searches a data position of interest by continuously watching a play screen or a fast-forward screen.

Japanese Laid Open Patent Publication No. Hei 06-153157 discloses a technique that allows an image to be searched with index images extracted in time-series order being displayed. This technique requires that an index generation process be performed beforehand. Images are acquired at regular intervals from image data recorded on a recording medium in order to generate an index image. The generated index image is then recorded on the recording medium again. Generating the index image takes time. The generated index image recorded on the recording medium reduces a memory capacity available on the recording medium.

SUMMARY OF THE INVENTION

Many of subjects photographed by a video camera typically contain persons. To learn the content and scene of the photographed data, the face of each person plays an important role. An image frame (picture) containing the face of each person in each scene recorded on a recording medium is detected and the face of the person is then extracted from the detected image. A thumbnail image is generated from the extracted face image. The generated thumbnail images are then displayed in a time-series order as time-series face thumbnail images.

With the time-series face thumbnail images displayed, the user correctly learns the content and cut of each scene. A playing process may be started at any thumbnail image of a designated face thumbnail image. An image processing apparatus, an imaging apparatus, an image display control method and a computer program, working in a user-friendly fashion, are thus provided.

In accordance with one embodiment of the present invention, an apparatus for processing an image, includes an input unit for inputting user operation information, a recording medium for recording moving image data, a data processor for retrieving data recorded on the recording medium and generating display data in response to an input to the input unit, and a display unit for displaying the display data. The data processor selects a frame containing an image of a person's face from a scene as a moving image recording unit recorded on the recording medium, generates a thumbnail image of a face region extracted from the selected frame and displays on the display unit a list of generated thumbnail images arranged in a time-series order.

The recording medium may record an image information management file for managing image information recorded on the recording medium. The data processor may acquire, from the image information management file recorded on the recording medium, information relating to the presence or absence of the face region and a position of the face region in each frame forming the scene as a moving image recording unit, select a frame containing the image of the person's face and generate a thumbnail image of the face region extracted from the selected frame.

The data processor may acquire information relating to the presence or absence of the face region and a position of the face region in a frame forming the scene by analyzing the scene as a moving image recording unit recorded on the recording medium, select a frame containing the image of the person's face and generate a thumbnail image of the face region extracted from the selected frame.

The data processor may generate a face thumbnail image by selecting an intra-frame compression encoded image serving as source data of a face thumbnail image to be displayed in the time-series thumbnail image list.

The input unit may include a touchpanel on the display unit. The data processor may input face thumbnail image designation information from a user designating a face thumbnail image on the time-series face thumbnail image list displayed on the display unit and play the image from an image position corresponding to the designated face thumbnail image.

The data processor may display on the display unit a scene index as a representative image of a scene as source data of the time-series face thumbnail image list and update the time-series face thumbnail image list in response to updating of the scene index if the scene index is updated.

In accordance with one embodiment of the present invention, an imaging apparatus includes an imaging unit for picking up an image, an input unit for inputting user operation information, a recording medium for recording moving image data, a data processor for retrieving data recorded on the recording medium and generating display data in response to an input to the input unit, and a display unit for displaying the display data. The data processor selects a frame containing an image of a person's face from a scene as a moving image recording unit recorded on the recording medium, generates a thumbnail image of a face region extracted from the selected frame and displays on the display unit a list of generated thumbnail images arranged in a time-series order.

The imaging apparatus may further include a face detector for detecting whether a face region of the image of the person's face is contained in image data acquired from the imaging unit. Upon detecting the face, the data processor displays on the display unit a face icon together with the picked up image to indicate that the face has been detected.

In accordance with one embodiment of the present invention, a method of an image processing apparatus for controlling image displaying, includes steps of inputting user operation information to an input unit, processing data by retrieving data recorded on a recording medium and generating display data in response to an input to the input unit, and displaying the display data on a display unit. The step of processing data includes selecting a frame containing an image of a person's face from a scene as a moving image recording unit recorded on the recording medium, generating a thumbnail image of a face region extracted from the selected frame and displaying on the display unit a list of generated thumbnail images arranged in a time-series order.

The step of processing data may include acquiring, from an image information management file recorded on the recording medium, information relating to the presence or absence of the face region and a position of the face region in each frame forming the scene as a moving image recording unit, selecting a frame containing the image of the person's face and generating a thumbnail image of the face region extracted from the selected frame.

The step of processing data may include acquiring information relating to the presence or absence of the face region and a position of the face region in each frame forming the scene by analyzing the scene as a moving image recording unit recorded on the recording medium, selecting a frame containing the image of the person's face and generating a thumbnail image of the face region extracted from the selected frame.

The step of processing data may include generating a face thumbnail image by selecting an intra-frame compression encoded image serving as source data of a face thumbnail image to be displayed in the time-series thumbnail image list.

The input unit may include a touchpanel on the display unit, and the step of processing data may include inputting face thumbnail image designation information from a user designating a face thumbnail image on the time-series face thumbnail image list displayed on the display unit and playing the image from an image position corresponding to the designated face thumbnail image.

The step of processing data may include displaying on the display unit a scene index as a representative image of a scene as source data of the time-series face thumbnail image list and updating the time-series face thumbnail image list in response to updating of the scene index if the scene index is updated.

In accordance with one embodiment of the present invention, a method of an imaging apparatus for controlling image displaying, includes steps of picking up an image, inputting user operation information to an input unit, detecting whether a face region of an image of a person's face is contained in acquired image data, displaying on a display unit a face icon together with the picked up image to indicate that the face has been detected if the face has been detected, and selecting a frame containing the image of the person's face from a scene as a moving image recording unit recorded on a recording medium, generating a thumbnail image of a face region extracted from the selected frame and displaying on the display unit a list of generated thumbnail images arranged in a time-series order.

In accordance with one embodiment of the present invention, a computer program for causing an image processing apparatus to control image displaying, includes steps of detecting inputting of user operation information, processing data by retrieving data recorded on a recording medium and generating display data in response to the inputting of the user operation information, and displaying the display data. The step of processing data includes selecting a frame containing an image of a person's face from a scene as a moving image recording unit recorded on the recording medium, generating a thumbnail image of a face region extracted from the selected frame and displaying a list of generated thumbnail images arranged in a time-series order.

In accordance with one embodiment of the present invention, a computer program for causing an imaging apparatus to control image displaying, includes steps of picking up an image, detecting inputting of user operation information, detecting whether a face region of a image of a person's face is contained in the picked up image data, displaying on a display unit a face icon together with the picked up image to indicate that the face has been detected if the face has been detected, and selecting a frame containing the image of the person's face from a scene as a moving image recording unit recorded on the recording medium, generating a thumbnail image of a face region extracted from the selected frame and displaying on the display unit a list of generated thumbnail images arranged in a time-series order.

A computer program in accordance with one embodiment of the present invention may be supplied in a computer readable form to a recording medium in a general-purpose computer system performing a variety of program code. The computer system thus performs a process responsive to the computer program with the computer program supplied in a computer readable form.

These and other objects, features and advantages of the present invention will become apparent from the following description of the embodiments of the present invention with reference to the accompanying drawings. The term system in this specification refers to a logical set of a plurality of apparatuses and elements of each apparatus are not necessarily housed in the same casing.

In accordance with embodiments of the present invention, time-series face thumbnail image data (face index) of each scene set as moving image recording unit is generated and displayed on the display unit. The user can easily learn the content of each scene based on the face image of the person in the photograph data. By designating a time-series face thumbnail image, the user can start playing images with an image frame serving as a source of the designated face thumbnail image. The user can thus immediately play a scene the user wants to play.

BRIEF DESCRIPTION OF THE DRAWINGS

FIG. 8 is a flowchart illustrating a recording process and a record stop process of face detection information in the recording of moving images.

DESCRIPTION OF THE PREFERRED EMBODIMENTS

Figure 1:
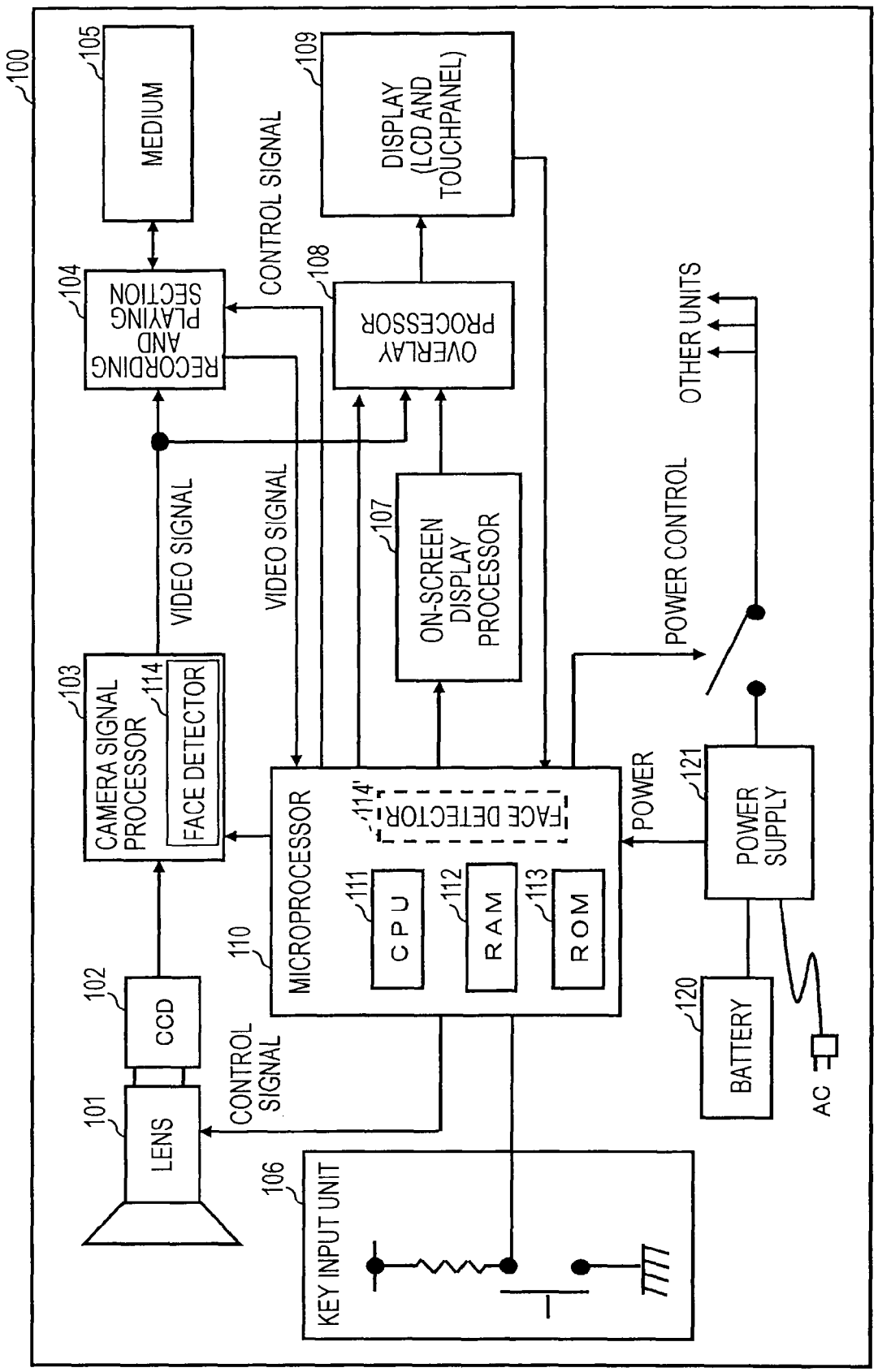
FIG. 1 illustrates an imaging apparatus as an example of image processing apparatus in accordance with one embodiment of the present invention.

An information processing apparatus, an imaging apparatus, an image display control method and a computer program in accordance with embodiments of the present invention are described below in detail with reference to the drawings.

An imaging apparatus 100 as one example of information processing apparatus is described below with reference to a block diagram of FIG. 1. When a photograph start signal is input to a microprocessor 110 from a key input unit 106 as a user operation unit, the microprocessor 110 starts a photographing process by outputting control signals to related elements. A focus mechanism, a shutter mechanism and an aperture stop mechanism all in a lens unit 101, controlled by the microprocessor 110, capture an image of a subject and supply the image onto a charge-coupled device (CCD) 102.

The CCD 102 photoelectrically converts the image into the image of the subject in the form of an electrical signal (image signal) and outputs the image signal to a camera signal processor 103. The camera signal processor 103 processes the image signal. For example, the camera signal processor 103 performs on the image signal a correlated double sampling (CDS) process, an automatic gain control (AGC) process, an analog-to-digital (A/D) conversion process, an auto focus (AF) process, an auto exposure (AE) process, an auto white balance (AWB) process, etc.

The camera signal processor 103, including a face detector 114, detects whether a face region of a person's face is contained in frame data of a photographed image. An existing face detection algorithm in the related art may be used for the face detection process.

Image data having undergone a variety of adjustments of the camera signal processor 103 is output together with face detection results of the face detector 114 to a recording and playing section 104 and a display 109. A photographed image is displayed as a through image on the display 109. If a face is detected by the face detector 114, a face icon is displayed on the through image indicating that the face has been detected. A display example of the face icon will be described later.

The recording and playing section 104 compresses data in accordance with a predetermined compression method and records the compressed data onto a recording medium 105. Recording methods of the recording medium include a high-definition video recording method with data compressed in accordance with moving picture experts group (MPEG)-4 AVC/H. 264 or standard definition (SD) video recording method with data compressed in accordance with MPEG-2. An image information management file (such as an AV index file) containing management information corresponding to compressed image information is generated and stored onto the recording medium 105.

The image information management file (AV index file) also contains metadata for each scene. The metadata contains face detection information from the face detector 114 in the camera signal processor 103. The face detection information indicates whether a person's face has been detected. If a person's face is detected, coordinates information indicating a face region of the person's face is contained in the face detection information. An image information management file (AV index file) containing the face detection information as the metadata at photograph time is recorded onto the recording medium 105.

The microprocessor 110 receives key operation information from the key input unit 106 and user operation information responsive to an key operation on a graphic user interface (GUI) presented on the display 109. The microprocessor 110 performs a process responsive to the user instruction. The display 109 includes a liquid-crystal display (LCD) touch-panel and displays the GUI which is ready to receive user operation information. Keys on the key input unit 106 are referred as "hard keys" and operation keys on the GUI displayed on the display 109 are referred to as "soft keys."

The microprocessor 110 is powered from a battery 120 or an alternating current power source via a power supply 121. The microprocessor 110 controls a variety of processes of the imaging apparatus 100. The microprocessor 110 controls a power control signal as necessary and performs power supply control on other elements. The microprocessor 110 analog-to-digital converts an input signal from a hard key on the key input unit 106 or an input signal from a soft key on the GUI on the display 109, determines from a resulting converted digital value a selected key and performs a variety of processes in response to the determination results. The microprocessor 110 includes a central processing unit (CPU) 111, a random-access memory (RAM) 112 and a read-only memory (ROM) 113 and performs the processes in accordance with pre-stored programs.

Upon receiving a play command responsive to a hard key on the key input unit 106 or a soft key on the GUI displayed on the display 109, the microprocessor 110 switches the imaging apparatus 100 to a video signal play mode. The microprocessor 110 reads data recorded on the recording medium 105 via the recording and playing section 104, performs a decoding process on the read data and displays the decoded data onto the display 109 via an overlay processor 108.

A on-screen display (OSD) processor 107 interprets a command input from the microprocessor 110 and transfers a display signal generated on a video RAM (VRAM) to the overlay processor 108 by scan unit. For example, the on-screen display processor 107 generates data, which is to be overlaid on GUI information and manual information, different from a video signal, and transfers the generated data to the overlay processor 108. The overlay processor 108 overlays the display signal from the on-screen display processor 107 on one of a recording video signal or a played video signal and outputs the resulting signals to the display 109.

The microprocessor 110 in the imaging apparatus 100 generates a thumbnail image list of image data recorded on the recording medium 105 in accordance with a user instruction and displays the thumbnail image list on the display 109. The microprocessor 110 selects an image containing a person's face from each scene recorded on the recording medium 105, generates a thumbnail image of the image containing the selected face and displays the generated thumbnail images as time-series thumbnail images on the display 109.

As the face detector 114 in the camera signal processor 103, a face detector 114' enclosed by a broken-line box in the microprocessor 110 of FIG. 1 determines whether a face region of a person's face is contained in each image. If the face detection information is contained in the image information management file (AV index file) in the recording process of the photograph data onto the recording medium 105, the microprocessor 110 does not need the face detector 114'. If the image information management file containing the face detection information is not present, the microprocessor 110 may perform the face detection process on the image data read from the recording medium 105. In such a case, the imaging apparatus 100 includes the face detector 114'. The face detector 114' in the microprocessor 110 is thus used to process data without the image information management file containing the face detection result.

The microprocessor 110 starts playing the image with an image position responsive to the thumbnail image selected in response to the inputting of user selection information on the time-series face thumbnail image data displayed on the display 109. The scene refers to image data from the start of the photographing of a moving image to the end of the photographing of the moving image. A plurality of pieces image data corresponding to a variety of scenes are stored on the recording medium 105. The image data changes in time length from scene to scene. One scene may be several seconds long and another scene may be one hour long or even longer.

The microprocessor 110 in the imaging apparatus 100 retrieves image data of a scene designated by a user from among the scenes stored on the recording medium 105, selects a frame containing a face image by analyzing the image information management file, extracts a face region from the selected frame, generates a face thumbnail image, arranges as face index images the face thumbnail images in a time-series order in the scene and outputs the face index images to the display 109. Display data of a time-series face thumbnail image list corresponding to one scene as moving image recording data unit is referred to as "face index screen."

An example of face index screen on the display 109 and switching of display data on the display 109 are described below with reference to FIG. 2.

The display 109 in the imaging apparatus 100 displays four types of screens, namely, standby screen (a), home-menu screen (b), face index screen (c) and moving image playing screen (d).

The microprocessor 110 receives and determines key operation information on the key input unit 106 (hard keys) on the imaging apparatus 100 or key operation information on the GUI containing a variety of keys displayed on the display 109 (soft keys) and switches screens.

Figure 2:
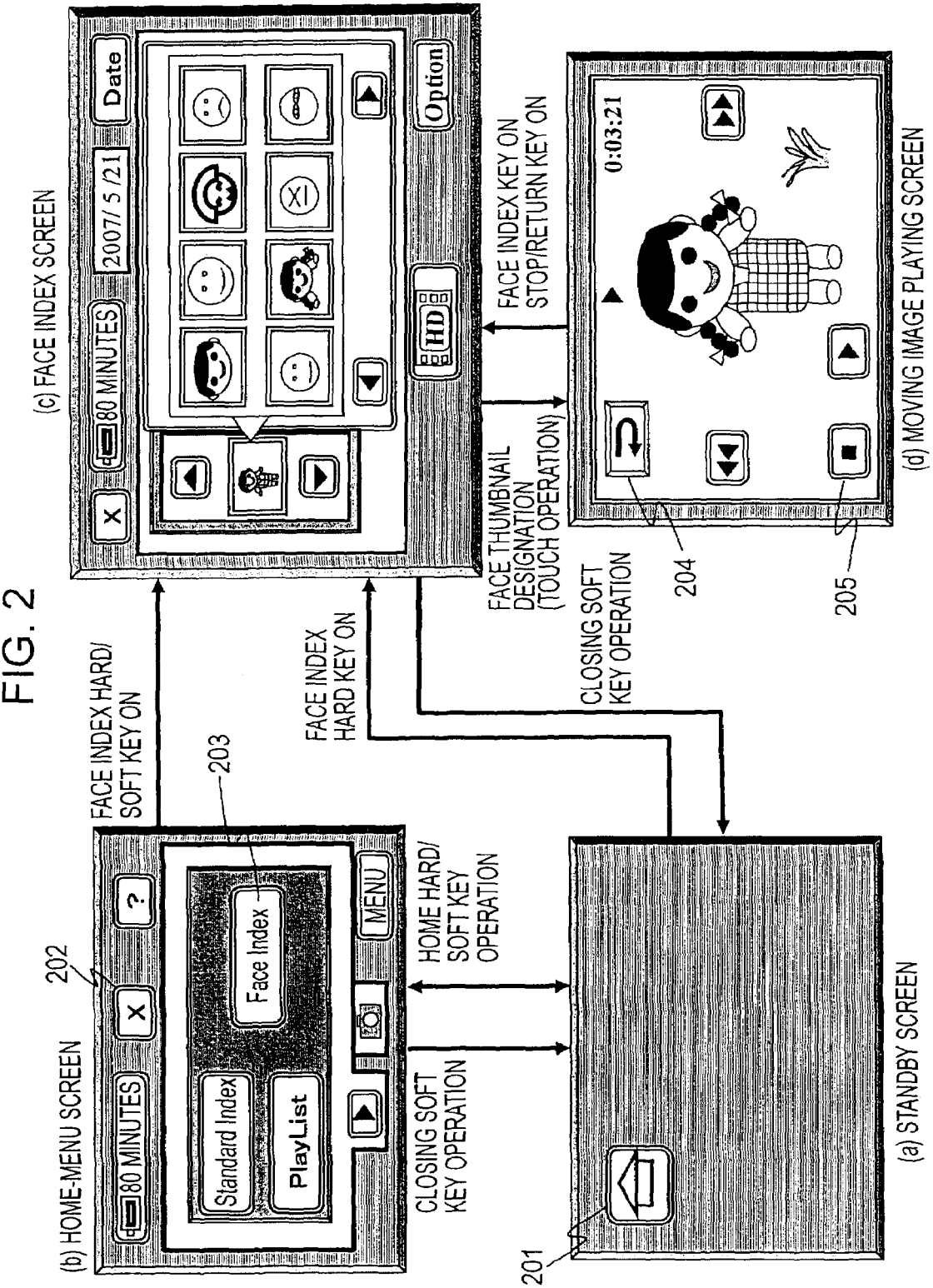
FIG. 2 illustrates a switching operation of screens presented on a display unit.

In FIG. 2, the time-series face thumbnail image list corresponding to one scene as moving image recording data unit is displayed in whole or part as display data on the face index screen (c). The face index screen is the time-series face thumbnail image data of the thumbnail images (contracted images) of the face regions. The face regions are extracted from the image containing the face selected from one scene as moving image recording data unit.

The microprocessor 110 generates the thumbnail image to be displayed on the face index screen when a request to display the face index screen (c) has been issued. The thumbnail image is temporarily stored on the RAM 112 in the microprocessor 110 while being output to the display 109 to be displayed. The thumbnail image used on the face index screen (c) is not recorded on the recording medium 105. The capacity of the recording medium 105 is not used to store the thumbnail image. The microprocessor 110 retrieves the compressed image (a high-definition (HD) video compressed in accordance with moving picture experts group (MPEG)-4 AVC/H. 264 or a standard definition (SD) video compressed in accordance with MPEG-2), extracts an intra-frame compression encoded image (also referred to as I-picture, I-frame or I-VOP), contracts the intra-frame compression encoded image and arranges the contracted images in a face index list area in an order. The generation method of the thumbnail image displayed on the face index screen (c) will be described later.

The standby screen (a), the home-menu screen (b), the face index screen (c) and the moving image playing screen (d) displayed on the display 109 of FIG. 2 and a switching operation of the screens are described below.

The switching operation between the standby screen (a) and the home-menu screen (b) is performed by selecting one of a home soft key 201 displayed on the standby screen (a) and a home hard key arranged on the imaging apparatus 100.

The switching operation from the home-menu screen (b) to the standby screen (a) is performed by selecting a closing soft key 202 on the home-menu screen (b).

The switching operation from the standby screen (a) to the face index screen (c) is performed by selecting a face index hard key arranged on the imaging apparatus 100.

The switching operation from the home-menu screen (b) to the face index screen (c) is performed by selecting one of the face index hard key arranged on the imaging apparatus 100 and a face index soft key 203 on the home-menu screen (b).

The switching operation from the face index screen (c) to the standby screen (a) is performed by selecting a closing soft key on the face index screen (c).

The screen switching to the face index screen (c) may be performed directly from the standby screen (a) to the face index screen (c) or from the standby screen (a) to the home-menu screen (b) and then to the face index screen (c).

The time-series face thumbnail images are displayed on the face index screen (c). The time-series face thumbnail images are organized by arranging in a time-series order the thumbnail images of the face regions extracted from the frame containing the face image selected from one scene as moving image recording data unit. When the user designates one of the face thumbnail images, the imaging apparatus 100 starts playing the moving image with an image frame from which the designated face thumbnail image is derived.

The moving image is played on the moving image playing screen (d). The microprocessor 110 of FIG. 1 stores on a memory (RAM 112) time information of the scene containing the face thumbnail images displayed on the face index screen (c) with each thumbnail image tagged with time. More specifically, the time information includes position information of each face thumbnail image in the scene containing the intra-frame compression encoded image and elapsed time information of each face thumbnail image from the scene head. These pieces of information are also retrieved from the image information management file (AV index file).

When the user designates a face thumbnail image by touching the face thumbnail image displayed on the face index screen (c) with the user's finger, the microprocessor 110 identifies the touched thumbnail image based on coordinates data at the designated position. The microprocessor 110 acquires the position information (time information) of the thumbnail image in the scene from the metadata of the management file for the designated thumbnail image and starts playing the moving image with that position.

The switching operation from the moving image playing screen (d) to the face index screen (c) is performed by selecting one of a return key 204 and a stop key 205 displayed on the moving image playing screen (d) or the face index hard key on the imaging apparatus 100.

The face index screen (c) will be described in detail later with reference to FIG. 3. The face index screen (c) includes a scene index display area 301 and a face index display area 302.

The scene index display area 301 displays a representative image selected from one scene as moving image recording data unit. The user can switch representative images by operating a scene index rewind key 303a and a scene forward key 303b. The representative image displayed on the scene index display area 301 is a thumbnail image at the scene head, for example.

The face index display area 302 displays a list of the thumbnail images of the face extracted from a still image selected as containing the face region from the scene (moving image data), to which the thumbnail images displayed on the scene index display area 301 belongs.

The face index display area 302 displays face index rewind/forward keys 306a and 306b. The user can switch thumbnail images different in time but in the same scene by selecting one of the face index rewind/forward keys 306a and 306b. If a plurality of face regions are contained in a single still image, a plurality of face images are arranged on the face index display area 302.

By selecting the scene index rewind/forward keys 303a and 303b on the scene index display area 301, the face indexes displayed on the face index display area 302 are also switched.

A generation process of the face thumbnail image displayed on the face index screen (c) is described in detail below with reference to FIG. 4. As previously described, the microprocessor 110 generates the thumbnail image to be displayed on the face index screen (c) in response to a display request to display the face index screen (c), and stores temporarily the thumbnail image on the RAM 112 while outputting the generated thumbnail image to the display 109 as the same time.

The microprocessor 110 retrieves the compressed image (a high-definition (HD) video compressed in accordance with moving picture experts group (MPEG)-4 AVC/H.264 or a standard definition (SD) video compressed in accordance with MPEG-2), extracts an intra-frame compression encoded image, contracts the intra-frame compression encoded image and arranges the contracted images in a face index list area in an order.

Figure 4:
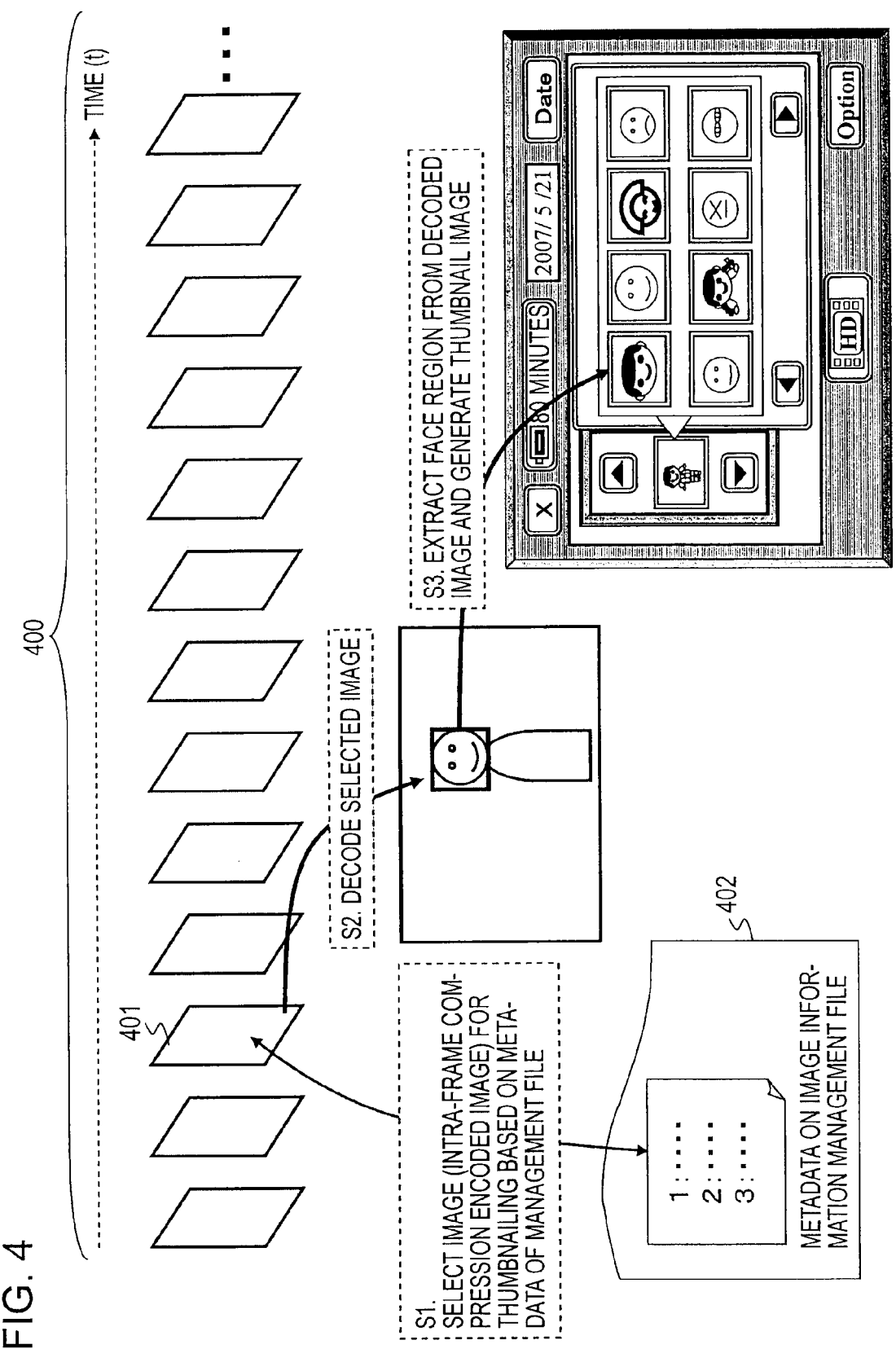
FIG. 4 illustrates a generation process of a thumbnail image displayed on the face index screen.

For example, MPEG data 400 forming the scene of FIG. 4 may be available. The MPEG data 400 contains frames (pictures) compressed in accordance with different formats. More specifically, an intra-frame compression encoded image (I picture), a B frame (B picture), a P frame (P picture), etc. may be included. Decodable data out of these pieces of encoded data is the intra-frame compression encoded image.

To generate the thumbnail image, the intra-frame compression encoded image is selected from the MPEG data and used. More specifically, the microprocessor 110 selects the intra-frame compression encoded image containing the face image region from the encoded data in a variety of formats contained in the scene serving as a source of the face index screen. The microprocessor 110 decodes the intra-frame compression encoded image, extracts the face region from the decoded image and generates the face thumbnail image.

FIG. 4 illustrates a selected intra-frame compression encoded image 401 containing the face region.

In step S1 of FIG. 4, the microprocessor 110 selects an image for a thumbnail image (intra-frame compression encoded image) 401 based on the metadata in a management file 402. The microprocessor 110 determines whether the face region is contained or not, based on the metadata of the image information management file (AV index file) 402. The frame containing the face region is not necessarily the intra-frame compression encoded image. If the frame containing the face region is not the intra-frame compression encoded image, a closest intra-frame compression encoded image subsequent to a face detected frame is selected as a thumbnail generation source image.

As discussed above, if data does not contain an intra-frame compression encoded image, the microprocessor 110 analyzes the scene in the face detection process, thereby determining the presence or absence of the face region of each frame.

The microprocessor 110 decodes the image frame 401 containing the thus selected face region (intra-frame compression encoded image) in step S2. In step S3, the microprocessor 110 extracts the face region from the decoded image frame and generates a thumbnail image of the face region, namely, a face thumbnail image.

Face region coordinates information of each frame is acquired from the image information management file (AV index file) 402. If data does not contain such a management file, the microprocessor 110 analyzes the scene, thereby determining the position of the face region. The thumbnail images thus constructed are arranged in the time-series order and then output to the display 109.

The recording medium 105 may be one of a hard disk drive (HDD) and a memory card and the image recorded on the recording medium 105 may be an HD video. Data stored on the recording medium is the one compressed in accordance with MPEG-4 AVC/H.264, for example, and may be a video recorded in accordance with AVCHD (registered trademark) standard. In such a case, record stream management files (a group of management files having extensions ".BDM," ".MPL" and ".CPI" generally managing the recording medium corresponding to VIDEO_TS.IFO files in DVD-Video format) are recorded together and processes using these record stream management files become possible. The microprocessor 110 reads the record stream management file and the image information management file (AV index file) for comparison. The microprocessor 110 thus acquires the position of the image frame containing the face region and the coordinates information of the face region in the frame.

If the image recorded on the recording medium 105 is an SD image, data stored on the recording medium is the one compressed in accordance with MPEG-2. If the recording medium 105 is one of the hard disk or the memory card, no record stream management file is contained. The microprocessor 110 tracks record stream information written beforehand on an extension area in the MPEG2 video signal and compares the record stream information with the image information management file (AV index file) in order to obtain a position of the image frame containing the face region. If the recording medium 105 is one of DVD-R, DVD+R, DVD-RW and DVD+RW, a record stream management file complying with one of AVCHD (registered trademark) standard, DVD-Video standard for SD video, DVD-VideoRecording standard and DVD+VR standard is also recorded. By comparing the recording stream management file with the image information management file (AV index file), the microprocessor 110 can technically acquire a position of the image frame containing the face region. Each standard for recording image onto a DVD medium does not include an image information management file (AV index file) for recording face information. An image information management file (AV index file) for recording face information may be written onto the recording medium, although such an operation is outside each standard. Alternatively, the microprocessor 110 may determines the face region position by analyzing the scene.

As previously described with reference to FIGS. 2 and 3, the face index screen displays a list of time-series face thumbnail images containing the face regions selected from one scene as moving image recording data unit. When the user selects one of the thumbnail images, the microprocessor 110 starts playing the moving image with the designated thumbnail image as a play start point.

When the HD video is recorded onto one of the HDD and the memory card and the DVD medium, the microprocessor 110 acquires the position information (time information from the data head) of the intra-frame compression encoded image from the record stream management file. When the SD video is recorded onto one of the HDD and the memory card, the microprocessor 110 analyzes the video signal stream and acquires the position information (time information from the data head) of the intra-frame compression encoded image corresponding to the face region contained in the record stream management file. The position information is stored onto the RAM 112. Using the position information, the microprocessor 110 immediately determines the position of the thumbnail image and starts playing the moving image with the designated thumbnail image. When the playing of the moving image is stopped, the microprocessor 110 returns to the face index screen indicating the time and position at which the scene stops.

With reference to FIG. 1, the image data on which the camera signal processor 103 has performed a variety of processes is output to the recording and playing section 104 and the display 109 together with the face detection information from the face detector 114. The display 109 receives photographed images as through images. If the face detector 114 detects any face, a face icon indicating that the face image has been detected from the through image is displayed. The face icon is described below with reference to FIG. 5.

Figure 5:
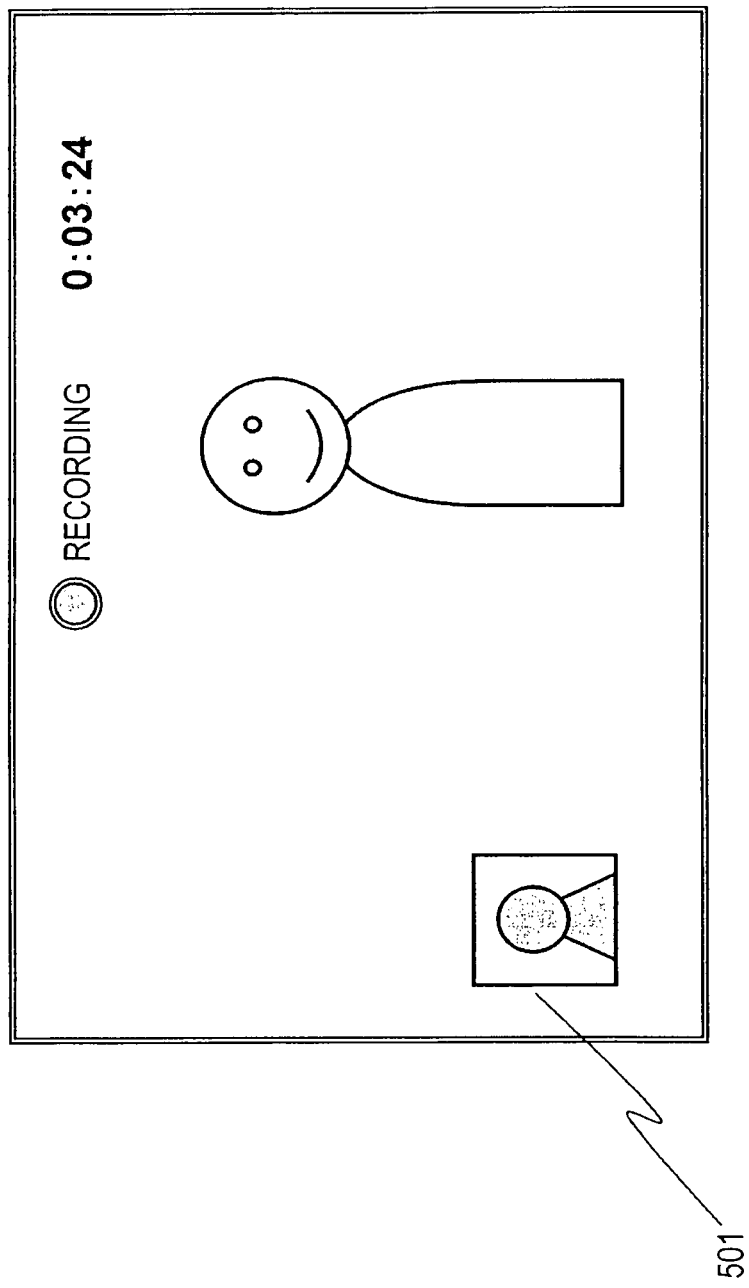
FIG. 5 illustrates an example of face icon displayed on the display unit.

FIG. 5 illustrates a photographed image (through image) displayed on the display 109. The face detector 114 in the camera signal processor 103 analyzes whether a face region is contained in the photographed image. If the face detector 114 has detected a face region, a face icon 501 indicating that a face region has been detected in the through image is displayed. The face icon 501 may be displayed in a variety of modes. For example, when the face region is detected on the screen, the face icon 501 may be flashed. The face detection information (including information as to whether the face region has been detected in each frame and the position (coordinates) information of the face region if the face has been detected) is recorded as the metadata of the image information management file (AV index file) corresponding to the image data.

The processes executed by the information processing apparatus of embodiments of the present invention are described below with reference to flowcharts of FIG. 6-8.

Figure 6:
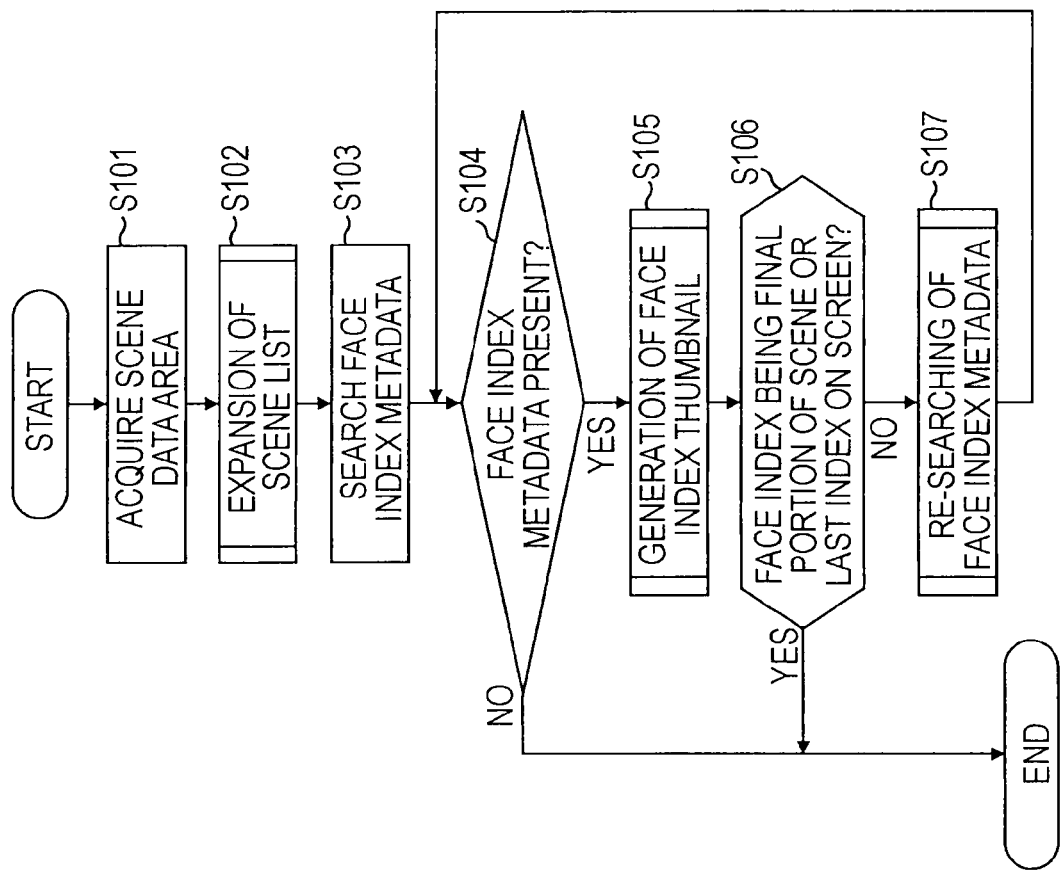
FIG. 6 is a flowchart illustrating a generation process and a display process of the face index screen.

FIG. 6 is the flowchart illustrating a generation process and a display process of the face index screen.

Figure 7:
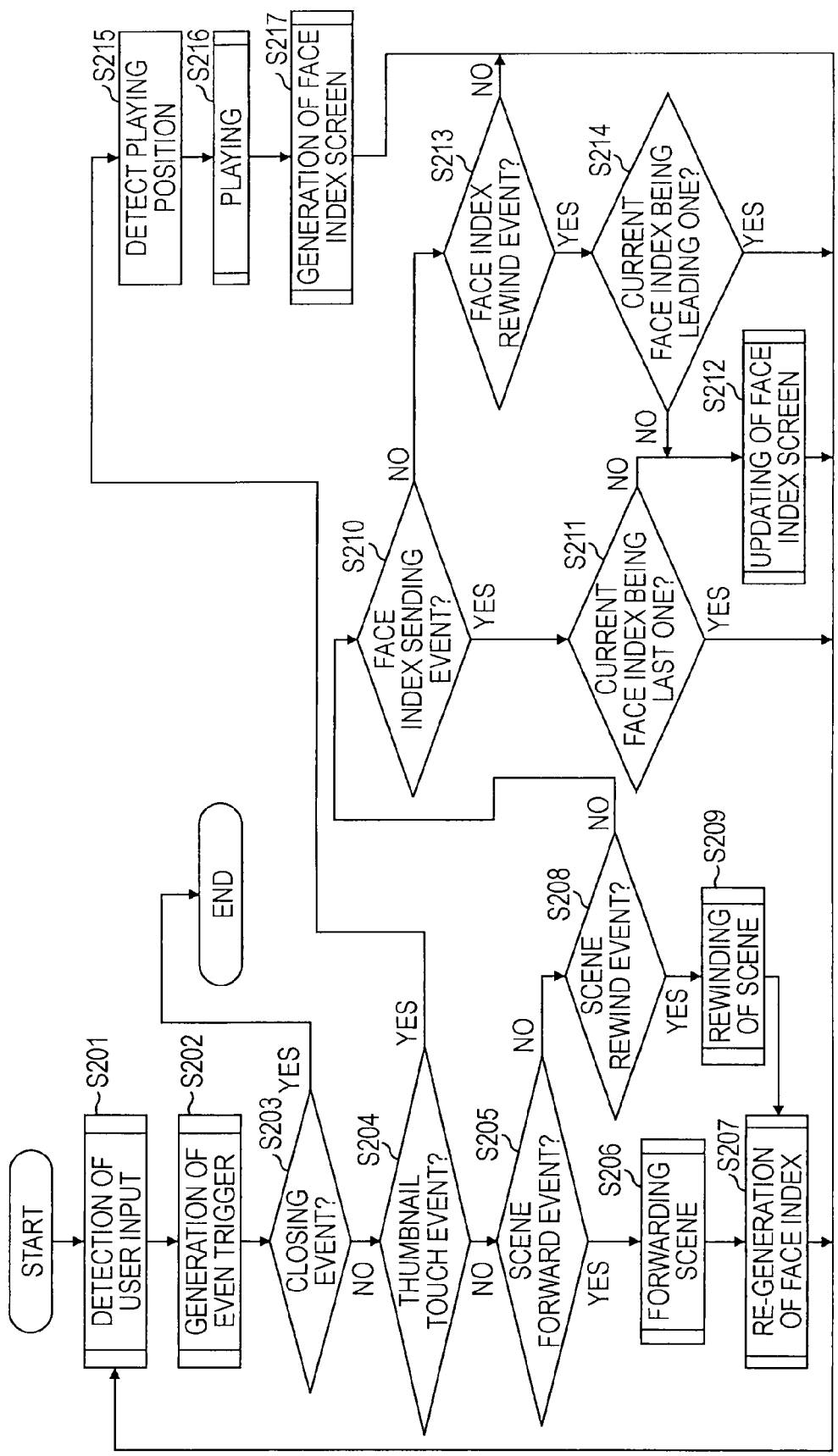
FIG. 7 is a flowchart illustrating a switching operation of the face index screen and other screens displayed on the display unit.

FIG. 7 is the flowchart illustrating a switching sequence of the face index screen and other screens displayed on the display unit.

FIG. 8 is the flowchart illustrating a recording process and a record stop process of face detection information in the recording of moving images.

With reference to FIG. 6, the generation and display process of the face index screen are described. The generation and display process of the face index screen is preformed under the control of the microprocessor 110 functioning as a data processor.

In step S101, a data area of a scene as a source for a face index is acquired from the recording medium storing a variety of scenes (moving image recording data units). In step S102, an index image of the scene as a source of the face index generation is displayed on the scene index display area 301. The index image of the scene corresponds to a contacted image of the intra-frame compression encoded image at the head of the video stream of the scene. In step S103, the metadata applicable to the face index generation (face index metadata) is searched in the image information management file (AV index file).

The face index metadata contains information indicating that a person's face has been detected in a frame contained in the scene and position (coordinates) information of the face region in the face detected frame.

In step S104, the microprocessor 110 determines whether the face index metadata has been detected from the image information management file (AV index file). If no face index metadata has been detected in the image information management file (AV index file), the face index cannot be generated and the process is quit. If the face index metadata has been detected in the image information management file, processing proceeds to step S105. The face index thumbnail is generated. This process is the one discussed with reference to FIG. 4. The intra-frame compression encoded image contained in the MPEG data is selected and used. More specifically, the microprocessor 110 selects the intra-frame compression encoded image containing the face image region from the encoded data in a variety of formats contained in the scene as a source of the face index screen, decodes the face image region, extracts the face region and generates the face thumbnail image.

In step S106, the microprocessor 110 determines whether the generated face index corresponds to an end frame of the scene or reaches a final face index displayed on a display screen. For example, in FIG. 3, eight face indexes are displayed on the face index screen and the microprocessor 110 determines whether the generation of a thumbnail of an eighth face index has been completed.

If the answer to the determination in step S106 is affirmative (yes), processing ends. If the answer to the determination in step S106 is non-affirmative (no), processing proceeds to step S107. The microprocessor 110 searches the face index metadata for successive frame. Processing returns to step S104 to repeat the same process. Through the process, the face index screen of FIG. 3 is generated and displayed on the display 109.

With reference to FIG. 7, the switching sequence of the face index screen and other screens displayed on the display unit is described. This process corresponds to the switching operation of each screen displayed on the display 109 discussed with reference to FIG. 2. This process is also performed under the control of the microprocessor 110 functioning as the data processor in the imaging apparatus 100 of FIG. 1. The process illustrated in the flowchart of FIG. 7 is performed with the face index screen of FIG. 3 displayed.

In step S201, the microprocessor 110 functioning as the data processor detects a user operation input. The operation input may be entered when a hard key arranged on the information processing apparatus or a soft key on the GUI presented on the display 109 is selected. Upon detecting an event trigger for switching screens in step S202, the microprocessor 110 proceeds to step S203. The microprocessor 110 determines whether the event is a "closing" event. In other words, the microprocessor 110 determines whether the closing soft key on each screen of FIG. 2 is selected.

If the closing soft key is selected, in other words, if the closing event is triggered, the microprocessor 110 sets the display 109 to the standby screen. Processing thus ends. If it is determined in step S203 that the event is not the closing event, processing proceeds to step S204. The microprocessor 110 determines whether the event is a "thumbnail touch event," i.e., determines whether a face thumbnail displayed on the face index screen of FIG. 3 is touched by the user. If it is determined in step S204 that the event is a "thumbnail touch event," processing proceeds to step S215. The microprocessor 110 identifies as a play start frame a frame serving as a source of the face thumbnail designated by the user. This play start position identification process is performed based on the metadata acquired from the image information management file or the record stream management file or record stream management data contained in a video stream.

In step S216, the microprocessor 110 starts playing the moving image with the play start position determined in step S215 and generates the face index in step S217. This face index generation process is a data generation process to display data on the face index screen at the stop of playing.

If it is determined in step S204 that the event is a "thumbnail touch event," processing proceeds to step S205. The microprocessor 110 determines whether the event is a "scene forwarding event." The scene forwarding event is generated at the moment the scene index forward key 303b discussed with reference to FIG. 3 is selected.

Figure 3:
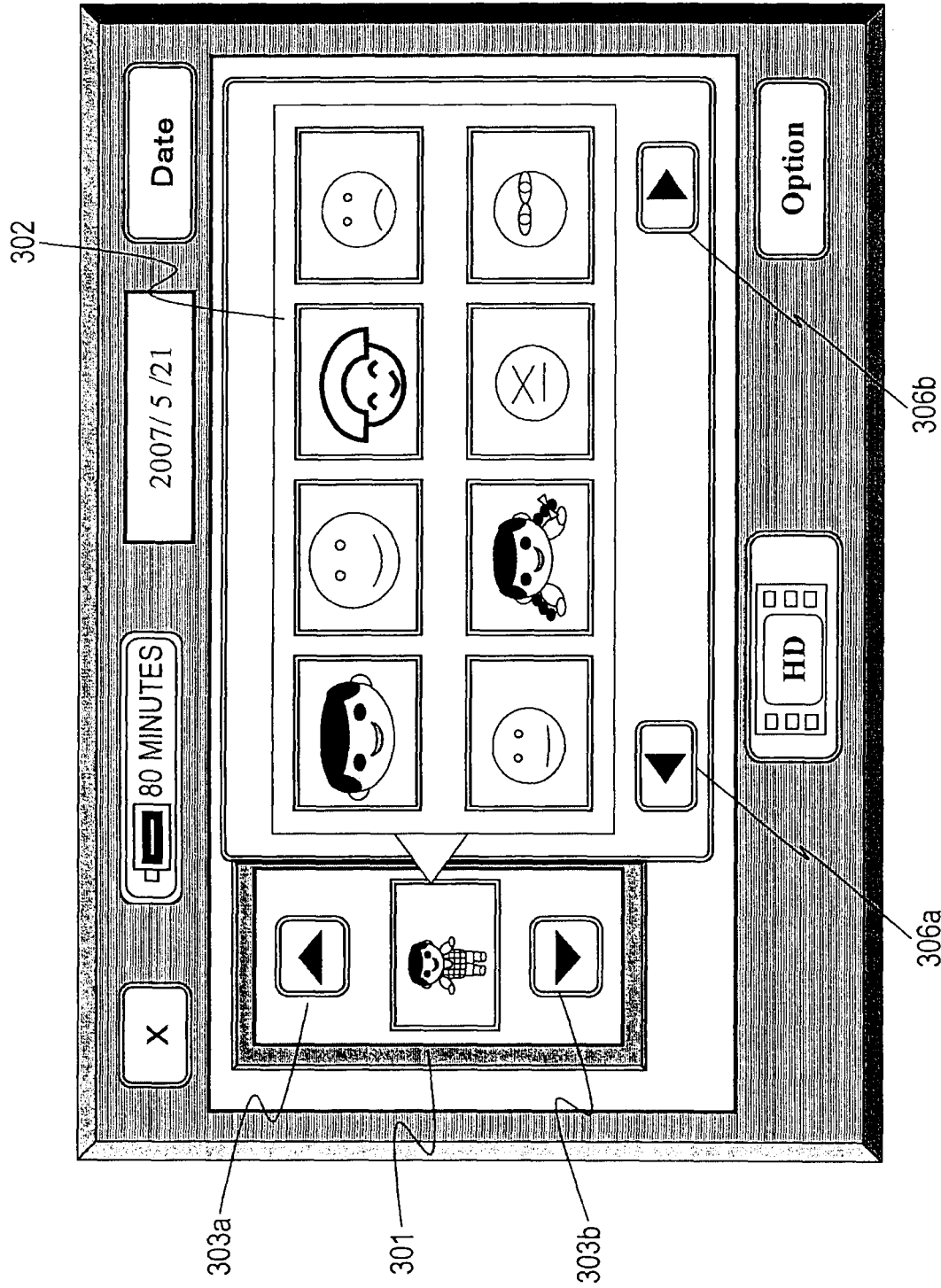
FIG. 3 illustrates a face index screen displayed on the display unit.

If it is determined in step S205 that the event is a "scene forwarding event," the microprocessor 110 forwards the scene in step S206, i.e., updates the scene index displayed on the scene index display area 301 of FIG. 3. In step S207, the microprocessor 110 generates a face index of the scene corresponding to the updated scene index and display the generated scene index.

If it is determined in step S205 that the event is not a "scene forwarding event," processing proceeds to step S208. The microprocessor 110 determines whether the event is a "scene rewind event." The scene rewind event is triggered when the scene index rewind key 303a of FIG. 3 is selected. If it is determined in step S208 that the event is a "scene rewind event," the microprocessor 110 rewinds the scene in step S209, i.e., updates the scene index displayed on the scene index display area 301 of FIG. 3. The microprocessor 110 generates a face index of the scene corresponding to the scene index updated in step S207 and displays the generated scene index.

If it is determined in step S208 that the event is not a "scene rewind event," processing proceeds to step S210. The microprocessor 110 determines whether the event is a "face index forwarding event." The face index forwarding event is triggered when the face index forward key 306b of FIG. 3 is selected.

If it is determined in step S210 that the event is a "face index forwarding event," processing proceeds to step S211. The microprocessor 110 determines whether the displayed face index is an index generated for a final data portion of the scene. If it is determined in step S211 that the displayed face index is not an index generated for a final data portion of the scene, processing proceeds to step S212. The microprocessor 110 generates a face index based on a scene forming frame subsequent to the currently displayed face index and displays the generated face index. If it is determined in step S211 that the displayed face index is an index generated for a final data portion of the scene, the microprocessor 110 returns to step S201.

If it is determined in step S210 that the event is not a "face index forwarding event," processing proceeds to step S213. The microprocessor 110 determines whether the event is a "face index rewind event." The face index rewind event is triggered when the face index rewind key 306a of FIG. 3 is selected.

If it is determined in step S213 that the event is a "face index rewind event," processing proceeds to step S214. The microprocessor 110 determines whether the displayed face index is an index generated in response to a data head portion of the scene. If it is determined in step S214 that the displayed face index is not an index generated in response to a data head portion of the scene, processing proceeds to step S212. The microprocessor 110 generates a face index based on a scene forming frame prior to the currently displayed face index and displays the generated face index. If it is determined in step S214 that the display face index is an index generated in response to a data head portion of the scene, processing returns to step S201. A variety of processes including the updating process of the face index screen of FIG. 3 is thus performed.

The recording process and the record stop process of the face detection information in the recording of the moving image are described below with reference to FIG. 8. In the recording process and the record stop process of the face detection information, the imaging apparatus 100 of FIG. 1 photographs the moving image and records the photographed moving image onto the recording medium 105. The face detection information is generated by the face detector 114 in the camera signal processor 103 and the recording and playing section 104. The imaging apparatus 100 of FIG. 1 is generally controlled by the microprocessor 110 functioning as the data processor. The process of FIG. 8 is a process sequence started on the premise that the recording of the moving image is currently in progress.

In the recording of the moving image, the microprocessor 110 detects a user operation input in step S301. The operation input may be entered when a hard key arranged on the information processing apparatus or a soft key on the GUI presented on the display 109 is selected. Upon detecting an event trigger for switching screens in step S302, the microprocessor 110 proceeds to step S303. The microprocessor 110 determines whether the event is a "record end event."

If it is determined in step S303 that the event is not a "record end event," processing proceeds to step S304. The microprocessor 110 determines whether the event is a "face detection event." The face detection event is triggered when a face detection command switch for setting whether to perform the face detection process arranged on the imaging apparatus 100 is operated. If it is determined in step S303 that the event is a "face detection event," the microprocessor 110 performs the face detection process in step S305. The face detector 114 in the camera signal processor 103 of FIG. 1 stores on the RAM in the camera signal processor 103 the face index metadata of each frame, namely, information indicating that a person's face has been detected in the frame contained in the scene and position (coordinates) information of the face detected frame.

To prevent the face index metadata from increasing to a vast amount of data, the microprocessor 110 stores the face index metadata on the RAM only when a change is detected in the detected number of faces instead of storing the face index metadata of all frames on the RAM.

If it is determined in step S303 that the event is a "record end event," processing proceeds to step S306 to stop recording the moving image. In step S307, the microprocessor 110 determines whether the face detection information is present in the recorded scene. If it is determined in step S307 that the face detection information is present in the recorded scene, the microprocessor 110 records in the image information management file (AV index file) the data stored on the RAM by the face detector 114 in the camera signal processor 103 as the face index metadata of each frame. The data stored on the RAM contains the information indicating that a person's face has been detected in the frame contained in the scene and the position (coordinates) information of the face detected frame. The microprocessor 110 updates the image information management file in step S309 and records the updated image information management file onto the recording medium. Processing thus ends.

If it is determined in step S307 that no face detection information is present in the recorded scene, the microprocessor 110 updates the image information management file with management data other than the face index metadata without recording the face index metadata in step S309 and records the updated image information management file onto the recording medium.

The present invention has been described with reference to the particular embodiments. It is obvious to any person of ordinary skill in the art that modifications and changes are possible without departing from the scope of the present invention. The embodiments of the present invention have been discussed for exemplary purposes only and are not intended to limit the present invention. The scope of the invention is determined solely by reference to the claims appended hereto.

The series of process steps described above may be performed using hardware, software or a combination of both. If the process steps are performed using software, a program recording a process sequence of the software may be installed onto a memory in a computer in dedicated hardware or may be installed onto a general-purpose computer that performs a variety of processes. The program may be pre-recorded on the recording medium. The program may be installed from the recording medium. Alternatively, the program may be received via a network such as a local area network (LAN) and installed onto a recording medium such as a hard disk in the computer.

The process steps may be performed in a time-series order as described above. Alternatively, the process steps may be performed in parallel or separately as necessary or depending on a throughput of the apparatus performing each process. In this specification, the term system refers to a logical set of a plurality of apparatuses and elements of each apparatus are not necessarily housed in a single casing.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus for processing an image, comprising:
an input device configured to input user operation information;
a recording medium configured to record moving image data, the moving image data comprising a plurality of scenes, wherein each scene comprises a plurality of frames of moving image data;
processing circuitry configured to retrieve data recorded on the recording medium and generate display data in response to an input to the input device; and
a display configured to display the display data, wherein
the processing circuitry is configured to display on the display a scene index which is a representative image of a scene, select frames containing an image of a person's face from the scene recorded on the recording medium corresponding to the displayed scene index, extract face regions from the selected frames, generate thumbnail images of face regions extracted from the selected frames, display on the display a list of face thumbnail images arranged in a time-series order generated from frames in the scene containing images of a person's face, wherein the frames of the scene corresponding to the displayed scene index are source data for the time-series face thumbnail image list, and update the time-series face thumbnail image list in response to updating of the scene index if the scene index is updated;
in response to a user designating the scene index, the processing circuitry being configured to display the time-series face thumbnail image list corresponding to the designated scene index only; and
in response to a user designating a face thumbnail image on the time-series face thumbnail image list displayed on the display, the processing circuitry being configured to play the moving image data from an image position in the scene corresponding to the designated face thumbnail image.

2. The apparatus according to claim 1, wherein the recording medium is configured to record an image information management file for managing image information recorded on the recording medium and wherein the processing circuitry is configured to acquire, from the image information management file recorded on the recording medium, information relating to the presence or absence of the face region and a position of the face region in each frame forming the scene, select a frame containing the image of the person's face and generate a thumbnail image of the face region extracted from the selected frame.

3. The apparatus according to claim 1, wherein the processing circuitry is configured to acquire information relating to the presence or absence of the face region and a position of the face region in a frame forming the scene by analyzing the scene recorded on the recording medium, select a frame containing the image of the person's face and generate a thumbnail image of the face region extracted from the selected frame.

4. The apparatus according to claim 1, wherein the processing circuitry is configured to generate a face thumbnail image by selecting an intra-frame compression encoded image serving as source data of a face thumbnail image to be displayed in the time-series thumbnail image list.

5. The apparatus according to claim 1, wherein the input device comprises a touchpanel on the display, and wherein the processing circuitry is configured to input face thumbnail image designation information from a user designating a face thumbnail image on the time-series face thumbnail image list displayed on the display and play the image from an image position corresponding to the designated face thumbnail image.

6. An imaging apparatus, comprising:
an imaging device configured to pick up an image;
an input device configured to input user operation information;
a recording medium configured to record moving image data, the moving image data comprising a plurality of scenes, wherein each scene comprises a plurality of frames of moving image data;
processing circuitry configured to retrieve data recorded on the recording medium and generate display data in response to an input to the input device; and
a display configured to display the display data, wherein
the processing circuitry is configured to display on the display a scene index which is a representative image of a scene, select frames containing an image of a person's face from the scene recorded on the recording medium corresponding to the displayed scene index, extract face regions from the selected frames, generate thumbnail images of face regions extracted from the selected frames, display on the display a list of face thumbnail images arranged in a time-series order generated from frames in the scene containing images of a person's face, wherein the frames of the scene corresponding to the displayed scene index are source data for the time-series face thumbnail image list, and update the time-series face thumbnail image list in response to updating of the scene index if the scene index is updated;
in response to a user designating the scene index, the processing circuitry being configured to display the time-series face thumbnail image list corresponding to the designated scene index only; and
in response to a user designating a face thumbnail image on the time-series face thumbnail image list displayed on the display, the processing circuitry being configured to play the moving image data from an image position in the scene corresponding to the designated face thumbnail image.

7. The imaging apparatus according to claim 6, further comprising a face detector configured to detect whether a face region of the image of the person's face is contained in image data acquired from the imaging device, wherein upon detecting the face, the processing circuitry displays on the display a face icon together with the picked up image to indicate that the face has been detected.

8. A method of an image processing apparatus for controlling image displaying, comprising:
inputting user operation information to an input device;
processing data by retrieving moving image data recorded on a recording medium, the moving image data comprising a plurality of scenes, wherein each scene comprises a plurality of frames of moving image data, and generating display data in response to an input to the input device; and
displaying the display data on a display, wherein
the processing of data includes displaying on the display a scene index which is a representative image of a scene, selecting frames containing an image of a person's face from the scene recorded on the recording medium corresponding to the displayed scene index, extracting face regions from the selected frames, generating thumbnail images of face regions extracted from the selected frames, displaying on the display a list of thumbnail images arranged in a time-series order generated from frames in the scene containing images of a person's face, wherein the frames of the scene corresponding to the displayed scene index are source data for the time-series face thumbnail image list, and updating the time-series face thumbnail image list in response to updating of the scene index if the scene index is updated;
in response to a user designating the scene index, the processing includes displaying the time-series face thumbnail image list corresponding to the designated scene index only; and
in response to a user designating a face thumbnail image on the time-series face thumbnail image list displayed on the display, the processing includes playing the moving image data from an image position in the scene corresponding to the designated face thumbnail image.

9. The method according to claim 8, wherein the processing of data comprises acquiring, from an image information management file recorded on the recording medium, information relating to the presence or absence of the face region and a position of the face region in each frame forming the scene, selecting a frame containing the image of the person's face and generating a thumbnail image of the face region extracted from the selected frame.

10. The method according to claim 8, wherein the processing of data comprises acquiring information relating to the presence or absence of the face region and a position of the face region in each frame forming the scene by analyzing the scene recorded on the recording medium, selecting a frame containing the image of the person's face and generating a thumbnail image of the face region extracted from the selected frame.

11. The method according to claim 8, wherein the processing of data comprises generating a face thumbnail image by selecting an intra-frame compression encoded image serving as source data of a face thumbnail image to be displayed in the time-series thumbnail image list.

12. The method according to claim 8, wherein the input device includes a touchpanel on the display, and wherein the processing of data comprises inputting face thumbnail image designation information from a user designating a face thumbnail image on the time-series face thumbnail image list displayed on the display and playing the image from an image position corresponding to the designated face thumbnail image.

13. A method of an imaging apparatus for controlling image displaying, comprising:
picking up an image;
inputting user operation information to an input device;
detecting whether a face region of an image of a person's face is contained in the picked up image;
displaying on a display a face icon together with the picked up image to indicate that the face has been detected if the face has been detected; and displaying on the display a scene index which is a representative image of a scene of moving image data recorded on a recording medium, the moving image data comprising a plurality of scenes, wherein each scene comprises a plurality of frames of moving image data, selecting frames containing the image of the person's face from the scene recorded on a recording medium corresponding to the displayed scene index, extracting face regions from the selected frames, generating thumbnail images of face regions extracted from the selected frames, and displaying on the display a list of face thumbnail images arranged in a time-series order generated from frames in the scene containing images of a person's face, wherein the frames of the scene corresponding to the displayed scene index are source data for the time-series face thumbnail image list, and updating the time-series face thumbnail image list in response to updating of the scene index if the scene index is updated;

in response to a user designating the scene index, displaying the time-series face thumbnail image list corresponding to the designated scene index only; and in response to a user designating a face thumbnail image on the time-series face thumbnail image list displayed on the display, playing the moving image data from an image position in the scene corresponding to the designated face thumbnail image.

14. A non-transitory computer-readable recording medium storing a computer program which when executed by an image processing apparatus, causes the image processing apparatus to perform a method of controlling the display of images, the method comprising:

detecting inputting of user operation information;

processing data by retrieving moving image data recorded on a recording medium, the moving image data comprising a plurality of scenes, wherein each scene comprises a plurality of frames of moving image data, and generating display data in response to the inputting of the user operation information; and displaying the display data, wherein the processing of data includes displaying on the display a scene index which is a representative image of a scene, selecting frames containing an image of a person's face from the scene recorded on the recording medium corresponding to the displayed scene index, extracting face regions from the selected frames, generating thumbnail images of face regions extracted from the selected frames, displaying a list of face thumbnail images arranged in a time-series order generated from frames in the scene containing images of a person's face, wherein the frames of the scene corresponding to the displayed scene index are source data for the time-series face thumbnail image list, and updating the time-series face thumbnail image list in response to updating of the scene index if the scene index is updated;

in response to a user designating the scene index, displaying the time-series face thumbnail image list corresponding to the designated scene index only; and in response to a user designating a face thumbnail image on the time-series face thumbnail image list displayed on the display, playing the moving image data from an image position in the scene corresponding to the designated face thumbnail image.

15. A non-transitory computer-readable recording medium storing a computer program which when executed by an imaging apparatus, causes the imaging apparatus to perform a method of controlling the display of images, the method comprising:

picking up an image;

detecting inputting of user operation information;

detecting whether a face region of a image of a person's face is contained in the picked up image data;

displaying on a display a face icon together with the picked up image to indicate that the face has been detected if the face has been detected; and retrieving moving image data recorded on a recording medium, the moving image data comprising a plurality of scenes, wherein each scene comprises a plurality of frames of moving image data, and generating display data in response to the inputting of the user operation information;

displaying on the display a scene index which is a representative image of a scene of moving image data recorded on the recording medium, selecting frames containing the image of the person's face from the scene recorded on the recording medium corresponding to the displayed scene index, extracting face regions from the selected frames, generating thumbnail images of face regions extracted from the selected frames and displaying on the display a list of face thumbnail images arranged in a time-series order generated from frames in the scene containing images of a person's face, wherein the frames of the scene corresponding to the displayed scene index are source data for the time-series face thumbnail image list, and updating the time-series face thumbnail image list in response to updating of the scene index if the scene index is updated;

in response to a user designating the scene index, displaying the time-series face thumbnail image list corresponding to the designated scene index only; and in response to a user designating a face thumbnail image on the time-series face thumbnail image list displayed on the display, playing the moving image data from an image position in the scene corresponding to the designated face thumbnail image.

16. An apparatus for processing an image, comprising:

a recording medium configured to record moving image data, the moving image data comprising a scene comprising a plurality of frames of moving image data;

processing circuitry configured to retrieve data recorded on the recording medium and generate display data in response to an input; and a display configured to display the display data, wherein the processing circuitry is configured to display on the display a scene index which is a representative image of a scene and is an image at a head of the scene, to select frames containing at least a face image from the moving image data recorded on the recording medium, to generate face thumbnail images of the face images corresponding to the selected frames, and to display on the display the scene index and a list of the face thumbnail images in a time-series order, in response to a user designating a face thumbnail image on the time-series face thumbnail image list displayed on the display, the processing circuitry being configured to play the moving image data from an image position in the scene corresponding to the designated face thumbnail image, and the processing circuitry is configured to display on the display a rewind key and a forward key, and to switch to a different representative image and different face thumbnail images associated with the different representative image, in response to a selection of one of the rewind key and the forward key.

17. The apparatus according to claim 16, wherein the recording medium is configured to record an image information management file for managing image information recorded on the recording medium and wherein the processing circuitry is configured to acquire, from the image information management file recorded on the recording medium, information relating to the presence or absence of the face image and a position of the face image in each frame, select a frame containing the face image, and generate a thumbnail image of the face image extracted from the selected frame.

18. The apparatus according to claim 16, wherein the processing circuitry is configured to acquire information relating to the presence or absence of the face image and a position of the face image in a frame by analyzing the moving image data recorded on the recording medium, select a frame containing the face image, and generate a thumbnail image of the face image extracted from the selected frame.

19. The apparatus according to claim 16, wherein the processing circuitry is configured to generate a thumbnail image by selecting an intra-frame compression encoded image serving as source data of a thumbnail image to be displayed in the list of thumbnail images.

20. A method of an image processing apparatus for controlling image displaying, comprising:
   processing data by retrieving moving image data recorded on a recording medium, the moving image data comprising a scene comprising a plurality of frames of moving image data, and generating display data in response to an input; and
   displaying the display data on a display,
   wherein the processing of data includes displaying on the display a scene index which is a representative image of the scene and is an image at a head of the scene, selecting frames containing at least a face image from the moving image data recorded on the recording medium, generating face thumbnail images of the face images corresponding to the selected frames, and displaying on the display the scene index and a list of the face thumbnail images in a time-series order,
   in response to a user designating a face thumbnail image on the time-series face thumbnail image list displayed on the display, the processing includes playing the moving image data from an image position in the scene corresponding to the designated face thumbnail image,
   the processing includes displaying on the display a rewind key and a forward key, and
   the processing includes switching to a different representative image and different face thumbnail images associated with the different representative image, in response to a selection of one of the rewind key and the forward key.

21. The method according to claim 20, wherein the processing of data comprises acquiring, from an image information management file recorded on the recording medium, information relating to the presence or absence of the face image and a position of the face image in each frame, selecting a frame containing the face image, and generating a thumbnail image of the face image extracted from the selected frame.

22. The method according to claim 20, wherein the processing of data comprises acquiring information relating to the presence or absence of the face image and a position of the face image in each frame by analyzing the moving image data recorded on the recording medium, selecting a frame containing the face image, and generating a thumbnail image of the face image extracted from the selected frame.

23. The method according to claim 20, wherein the processing of data comprises generating a thumbnail image by selecting an intra-frame compression encoded image serving as source data of a thumbnail image to be displayed in the list of thumbnail images.

* * * * *